United States Patent [19]

Carter et al.

[11] Patent Number: 4,629,285
[45] Date of Patent: Dec. 16, 1986

[54] COLOR CODED OPTICAL FIBER WAVEGUIDES AND METHOD FOR COLORING SAME

[75] Inventors: R. Sykes Carter; Earl M. Seagrave, both of Charlotte, N.C.

[73] Assignee: Fusion UV Curing Systems Corporation, Rockville, Md.

[21] Appl. No.: 582,091

[22] Filed: Feb. 21, 1984

[51] Int. Cl.[4] .............................................. G02B 6/44
[52] U.S. Cl. ........................ 350/96.23; 350/96.29
[58] Field of Search ............... 350/96.23, 96.29, 96.34; 8/444, 507, 509, 523

[56] References Cited

U.S. PATENT DOCUMENTS

| 4,113,350 | 9/1978 | Haines . | |
|---|---|---|---|
| 4,125,644 | 11/1978 | Ketley et al. | 427/36 |
| 4,157,892 | 6/1979 | Tanaka et al. | 8/444 |
| 4,415,332 | 11/1983 | Lenox et al. | 8/444 |
| 4,494,954 | 1/1985 | Suminoe et al. | 8/509 |

FOREIGN PATENT DOCUMENTS

| 2728613 | 1/1978 | Fed. Rep. of Germany | 8/509 |
|---|---|---|---|
| 2845374 | 4/1979 | Fed. Rep. of Germany | 8/507 |
| 3241257 | 5/1983 | Fed. Rep. of Germany | 350/96.29 |

OTHER PUBLICATIONS

McGraw-Hill Encyclopedia of Science & Technology, vol. 7, pp. 159-161, 1983.

*Primary Examiner*—William L. Sikes
*Assistant Examiner*—Robert E. Wise
*Attorney, Agent, or Firm*—Bell, Seltzer, Park & Gibson

[57] ABSTRACT

To facilitate product identification and/or identification of individual optical glass fiber waveguides in a cable, the optical glass fiber waveguides are color coded with a relatively thin coating of color ultraviolet curable ink. The UV cured ink coating may cover the entire outer surface of the waveguide, or may be applied over less than the entire circumference or discontinuously along the length to form various patterns.

19 Claims, 6 Drawing Figures

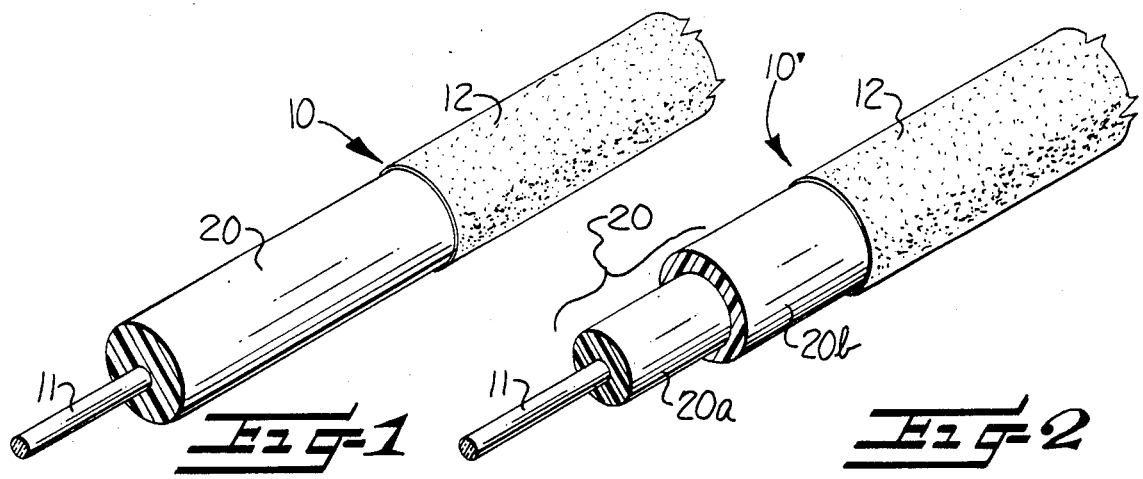
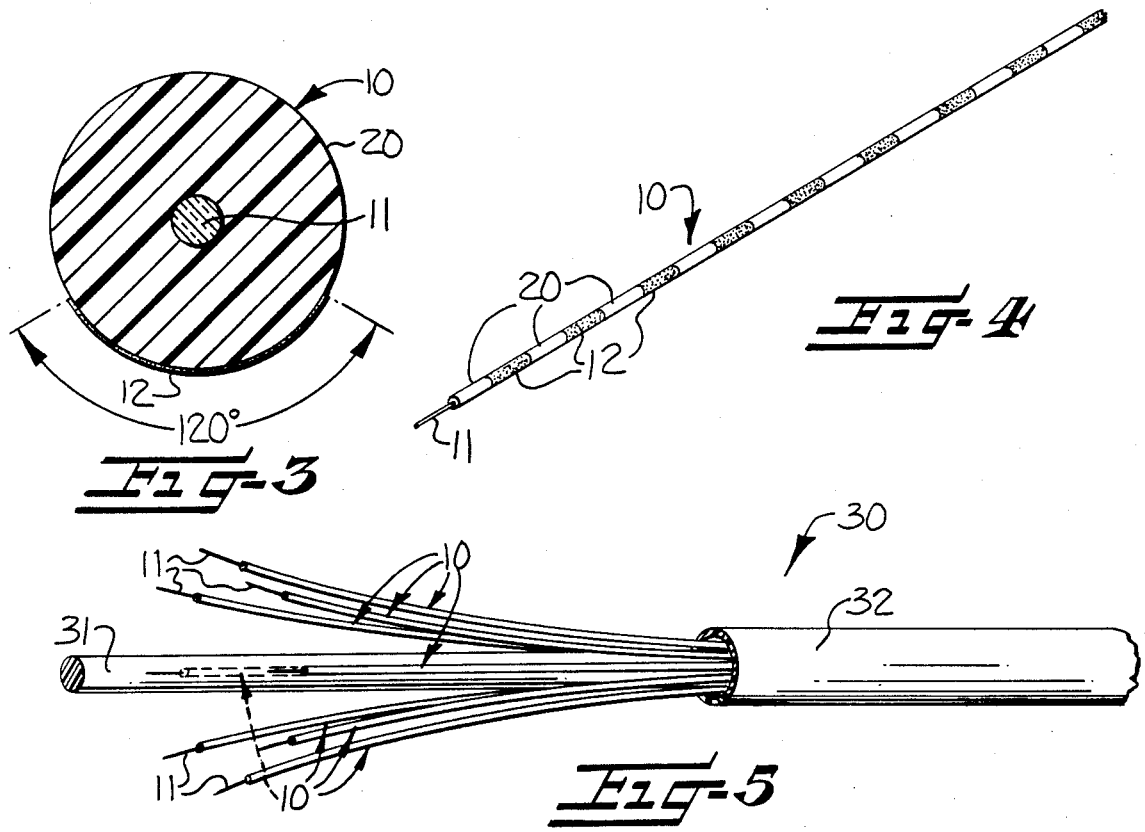
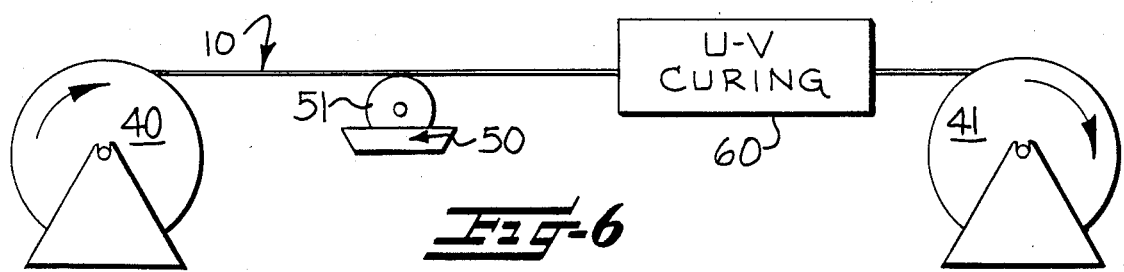

COLOR CODED OPTICAL FIBER WAVEGUIDES AND METHOD FOR COLORING SAME

FIELD OF THE INVENTION

This invention relates to optical glass fiber waveguides which are color coded to facilitate product identification and/or identification of individual optical glass fibers in various field applications. More particularly, this invention is directed to optical glass fiber waveguides color coded with a relatively thin coating of colored ultraviolet cured ink and a method for coloring same.

BACKGROUND OF THE INVENTION

The use of optical glass fiber waveguides as a desired means for transmitting data has continued to grow in popularity. Fiber optic linkages have a very high information carrying capacity for their relatively small cross-sectional size, particularly in comparison to metal conductor wires.

The small size and fragile nature of the optical glass fibers make them very difficult to handle, however. Furthermore, the large number of virtually identical individual fibers present in most such installations makes fiber connection and splicing almost impossible without some assistance in fiber identification.

It therefore would be most desirable if individual optical fibers could be color coded, such as in accordance with the standard telecommunications color code as metal conductor wires typically are. This would permit ready and accurate identification of the individual optical glass fibers encountered in various applications. Unfortunately, up to now, various difficulties have prevented optical glass fiber waveguides from readily being supplied in such color coded form.

For example, it has not proven satisfactory to use conventional solvent based colorants, such as dyes, marking fluids, inks and the like, for color coding optical glass fiber waveguides, since such colorants lack acceptable compatibility with and adhesion to the protective coatings typically present on optical glass fiber waveguides and usually do not have long term resistance to the oils and gels encountered in cable installations. Solventbased colorants are also easily worn away by the physical abrasion typically encountered in cabling. Furthermore, such materials contain environmentally undesirable solvents and are difficult to apply with sufficient precision to leave a truly uniform coating about the circumference of the optical fiber. As far as the application of liquid solvent inks is concerned, conventional ink application apparatus and techniques are unsuitable for processing the fragile optical fibers.

As stated above, optical glass fibers are very fragile and easily subject to damages. Typically, therefore, they are coated with one or several protective plastic coatings as are discussed in U.S. Pat. Nos. 4,125,644 and 4,344,669. These protective coatings are applied as soon as the fibers are formed to protect against abrasion during takeup and handling.

It has been stated in U.S. Pat. No. 4,125,644 that various additives including pigments may be added to these protective plastic coatings, if desired. Thus to some degree coloration of the exterior of the fiber by coloration of the protective coating may be accomplished by the fiber producer to assist him in identifying particular products. However, as noted in U.S. Pat. No. 4,125,644, the type and quantities of substances added to the buffer coatings must be selected with care to avoid disturbing the desired qualities of the coatings. Also, the addition of pigment additives to the buffer coatings slows down the drawing and curing of the fibers and overall fiber production speed. These limitations restrict the extent of buffer coloration possible or desirable and preclude the feasibility of attaining full spectrum coloration of buffer coatings of all types as would be necessary to effectively color code and identify individual fibers.

Furthermore, in the production of optical fiber cables, it is important that the physical and optical characteristics of the fiber waveguides in the cable be carefully matched, and it is often desirable that all of the fiber waveguides be from the same production run or lot. Thus, even though it may be known that colorants can be added to the buffer coatings, as noted above, it is not feasible for the fiber producer to attempt to color code the fibers for fiber identification purposes by this method.

SUMMARY OF THE INVENTION

The present invention provides a color coded optical fiber waveguide and method of production which overcomes the aforementioned shortcomings and deficiencies.

In accordance with the present invention and optical fiber waveguide comprised of an optical fiber and a protective coating surrounding the glass fiber is provided with an additional coating of colored UV cured ink which provides a visually distinguishable color identification code for the waveguide. This UV cured ink coating can be applied as a very thin film, typically a thickness significantly less than that of the protective buffer coating, and no more than about 20 percent of the waveguide diameter, to avoid undesirably affecting the concentricity of the coatings and to maintain the waveguide diameter as small as possible. For example, the UV cured ink coating may be applied as a very thin film no more than 10 microns in thickness. This UV cured ink coating provides vivid and highly opaque colors which are easily distinguished visually on the very fine diameter (e.g. up to about 250 micron) fiber waveguides.

The method of this invention particularly lends itself for being carried out by the manufacturer of optical fiber cables as a way to identify and distinguish the individual fiber waveguides of the cable to facilitate connection or splicing. Broadly, the method provides for imparting a visually distinguishable color identification code to an optical fiber waveguide comprised of an optical glass fiber and a protective coating surrounding the fiber, and comprises the steps of unwinding the optical fiber waveguide from a supply spool and directing the waveguide along a predetermined path, applying to the advancing waveguide a coating of a colored UV curable ink, exposing the advancing ink-coated waveguide to ultraviolet radiation to thereby cure the colored UV curable ink, and rewinding the thus color coded optical glass fiber wave guide on a take-up spool.

BRIEF DESCRIPTION OF THE DRAWINGS

Further and more specific features and advantages of the invention will become more apparent when taken in connection with the accompanying drawings, in which FIG. 1 is a partial isometric view showing one embodiment of the waveguide of the invention with portions shown broken away for clarity;

FIG. 2 is a partial isometric view showing a second embodiment of the waveguide of the invention with portions shown broken away for clarity;

FIG. 3 is a cross-sectional view showing a third embodiment of the waveguide of the invention;

FIG. 4 is a partial isometric view showing a fourth embodiment of the waveguide of the invention;

FIG. 5 is a partial isometric view, with portions shown removed for clarity, showing a cable made up of color coded waveguides of the invention; and FIG. 6 is a schematic illustration of a method of coloring the waveguide of the invention.

DETAILED DESCRIPTION OF THE INVENTION

While the present invention will be described more fully hereinafter with reference to the accompanying drawings, in which particular embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more specifically to the drawings, FIG. 1 illustrates a typical optical glass fiber waveguide in accordance with the invention. The waveguide, generally indicated at 10, comprises a central fiber 11 of optical glass which is surrounded by a protective coating 20, often referred to as a "buffer coating." Because of their small size and fragile nature, optical glass fibers 11 are customarily surrounded by a protective buffer coating which serves to protect the fiber from loss of strength due to mechanical abuse such as abrasion and microscratching or due to corrosion or hydrolytic attack.

The waveguide 10' of FIG. 2 is similar to that of FIG. 1 except that the buffer coating 20 is comprised of two coats or layers, a primary buffer coating 20a which surrounds the fiber core 11 and a secondary coating 20b surrounding the primary coating 20a. The primary coating 20a is preferably formed of a relatively soft, flexible material to provide resistance to microbending of the fiber 11. The secondary coating 20b is of a relatively hard, tough material and provides good handling properties for the fiber 11 and resistance to abuse in cabling operations.

The buffer coating 20 may be formed of various materials. In the past, buffer coatings have been formed of various types of silicone resins. Also, it has been known to extrude protective secondary buffer coatings or jackets of thermoplastic resin such as nylon over an underlying primary buffer coating. More recently, however, UV curable acrylate resins have become favored for use as buffer coatings. Acrylate resins have become favored since they can be cured at high speeds with ultraviolet light into coatings having properties ranging from soft and elastic to hard and tough depending on the resin selected.

The optical glass fiber 11 typically has a diameter ranging from about 5 microns to about 140 microns. The thickness of the buffer coating 20 typically equals or exceeds the diameter of the fiber that it surrounds. Buffer coating 20 is applied to glass fiber 11 during the same sequence of operations in which fiber 11 is produced in order to protect the extremely fragile fiber 11 from abrasion and damage during takeup and handling.

After the buffer coating 20 has been applied, and in preparation of the waveguide being readied for field installation, a very thin coating 12 of colored ultraviolet curable ink is applied to the coated fiber to form the color coded waveguide 10 of the invention. Selected predetermined colors, which may for example be in accordance with those of the standard telecommunications color code or in accordance with a selected product code, are utilized so that the color coded waveguides 10 may be readily handled and identified in installation and splicing operations. Inventoried coated fibers of various types and characteristics can thus be color coded as desired to suit the particular installation involved.

The use of ultraviolet curable ink is desired for fiber coloration for several reasons. The ink may be highly pigmented to provide good opacity and vivid colors that are easily identified on the very fine diameter waveguide. This permits selection of a wide variety of colors, including those of the standard telecommunications color code. Ultraviolet curable inks are compatible and nonreactive with the fiber buffer coatings, which are typically UV cured themselves.

Ultraviolet cured inks remain vivid even after being applied to coated glass fibers and have been found to resist color fading, abrasion, leaching and aging under installation and use conditions, which were significant problems with conventional colorants and inks. Also, since these UV cured inks are applied without a solvent as a 100% solids system, they can be applied precisely in the desired uniform thickness which remains the same during and after curing. This allows fiber concentricity to be maintained at the highest level.

The inks which have been found to be most suitable for use in this invention are pigmented opaque UV curable formulations based upon acrylated monomers, and are of the type formulated and sold for use in letterpress printing operations. The ink is supplied in viscous paste form containing the desired pigments and, typically, reactive acrylated monomers such as trimethylpropanetriacrylate, prepolymers and photoinitiators. Examples of suitable inks of this type include those inks known as Group 1 UV Suncure inks available from Sun Chemical Corporation of Atlanta, GA.

The UV curable ink is applied to form a coating of minimum thickness, preferably being no thicker than about 10 microns and desirably no thicker than about 5 microns. The coating of UV curable ink desirably has a thickness of no more than about 20 percent of the overall waveguide diameter which is significantly less than the thickness of the protective buffer coating 20. Applying the UV curable ink 12 as thinly as possible allows the size of the waveguide 10 to be maintained at a minimum diameter. This is highly desirable since space in optical fiber waveguide installations is at a great premium.

The UV curable ink coating 12 may be applied continuously along the entire length of the coated fiber waveguide 10 so that any portion taken from a length or reel of the waveguide 10 will be colored. The ink 12 may be applied around the entire circumference of the waveguide 10 in solid fashion as shown in FIGS. 1 and 2. However, if desired to form a particular effect or pattern, or to facilitate field testing of the optical properties, the UV curable ink 12 may be applied to less than 360° or less than the entire circumference of the waveguide 10, such as the 120° sector of the circumference as shown colored in FIG. 3. FIG. 4 illustrates another coloration pattern wherein lengthwise portions of the waveguide 10 alternately are colored and not colored, such as every half inch for example, so that the coating 12 of UV cured ink is discontinuous along the length of the waveguide 10. This provides another form of color coding. It is also possible to apply the ink in multicolor patterns, to further increase the number of possible different color combinations.

FIG. 5 illustrates a cable 30 made up of a plurality of fiber optic waveguides 10 wrapped about a supporting member or core 31 and enclosed by a protective sheath 32. This typifies the manner in which the waveguides 10 are used in the field.

FIG. 6 illustrates schematically the desired method of imparting the visually distinguishable color identification code to the optical glass fiber waveguide 10. A continuous length of buffer coated glass fiber waveguide 10 is unwound from a supply spool 40 and directed along a predetermined path and subjected to an application of colored UV curable ink at station 50. The ink is applied by printing it onto the waveguide 10. As illustrated, a thin film of UV curable ink is applied onto a rotating applicator roll 51 which then contacts the advancing waveguide 10 to thereby transfer the ink from the roll 51 to the waveguide 10. Desirably the ink is directed from a supply source to the applicator roll at a predetermined rate correlated with the rate of transfer of the ink from the applicator roll to the waveguide so that the ink is taken away by the waveguide at substantially the same rate as it is supplied to the applicator.

The advancing ink-coated waveguide 10 is then exposed to ultraviolet radiation at UV curing station 60 to cure the colored UV curable ink. The advancing ink-coated waveguide is exposed to ultraviolet radiation at a wavelength preferably ranging from approximately 200 to approximately 400 nanometers for a suitable duration typically ranging from about 0.005 to about 0.500 seconds. The advancing waveguide 10 may then be rewound on a takeup spool 41 for storage and later use.

In the drawings and specification, there have been disclosed typical preferred embodiments of the invention, and although specific terms are employed, they are used in a generic and descriptive sense only and not for purposes of limitation.

That which is claimed is:

1. A color coded optical fiber waveguide comprising an optical glass fiber, a protective coating surrounding the glass fiber, and an additional coating of colored UV cured ink applied to the protective coating and providing a visually distinguishable color identification code for the waveguide, said UV cured ink coating having a thickness of no more than about 20 percent of the waveguide diameter.

2. The optical fiber waveguide of claim 1 wherein said UV cured ink coating has a thickness significantly less than that of the protective buffer coating.

3. The optical fiber waveguide of claim 1 wherein the UV cured ink coating is no thicker than about 10 microns.

4. The optical fiber waveguide of claim 1 wherein the UV cured ink coating extends over less than the entire circumference of the waveguide.

5. The optical fiber waveguide of claim 1 wherein said UV cured ink comprises a thin coating of a pigmented opaque polymer.

6. The optical fiber waveguide of claim 1 wherein said UV cured ink comprises a pigmented acrylated polymer.

7. The optical fiber waveguide of claim 1 wherein said protective coating is comprised of a plurality of coats, each coat being of different chemical composition to impart particular desired physical characteristics to the waveguide.

8. A color coded optical fiber waveguide comprising an optical glass fiber, a relatively thick protective coating of a UV cured polymer surrounding the fiber, and a relatively thin coating of colored UV cured ink overlying the relatively thick protective coating and providing a visually distinguishable color identification code for the waveguide, said UV cured ink coating having a thickness of no more than about 20 percent of the waveguide diameter.

9. The optical fiber waveguide of claim 8 wherein said UV cured ink coating is of a thickness no more than approximately 10 microns.

10. The optical fiber waveguide of claim 8 wherein the UV cured ink coating extends over less than the entire circumference of the waveguide.

11. The optical fiber waveguide of claim 8 wherein the UV cured ink coating is discontinuous along the length of the waveguide.

12. The optical fiber waveguide of claim 8 wherein the UV cured ink comprises an opaque pigmented polymer.

13. A color coded optical fiber waveguide comprising an optical glass fiber, a protective primary buffer coating of a UV cured polymer surrounding the fiber, a protective secondary buffer coating of a UV cured polymer surrounding the primary buffer coating, and a coating of a colored UV cured ink applied to the secondary buffer coating and providing a visually distinguishable color identification code for the waveguide, said UV cured ink having a thickness of no more than approximately 10 microns.

14. A cable comprising a plurality of the optical fiber waveguides as described in any one of claims 1, 8 or 13.

15. A method of imparting a visually distinguishable color identification code to an optical glass fiber waveguide comprised of an optical glass fiber and a protective coating surrounding the fiber, said method comprising unwinding the optical fiber waveguide from a supply spool and directing the waveguide along a predetermined path, applying to the advancing waveguide a coating of a colored UV curable ink having a thickness of no more than about 20 percent of the waveguide diameter, exposing the advancing ink-coated waveguide to ultraviolet radiation to thereby cure the colored UV curable ink, and rewinding the thus color coded optical glass fiber waveguide on a takeup spool.

16. The method of claim 15 wherein said step of applying the UV curable ink comprises printing the UV curable ink onto the waveguide.

17. The method of claim 16 wherein said printing step comprises applying a thin film of the UV curable ink onto a rotating applicator roll, and directing the advancing waveguide into contact with the rotating ink-coated applicator roll to thereby transfer the ink from the roll to the waveguide.

18. The method of claim 17 wherein the step of applying a film of the ink onto an applicator roll comprises directing the ink from a supply source to the applicator roll at a predetermined rate correlated with the rate of transfer of the ink from the applicator roll to the waveguide so that the ink is taken away by the waveguide at substantially the same rate as it is supplied to the applicator.

19. The method of claim 15 wherein the advancing ink-coated waveguide is exposed to ultraviolet radiation at a wavelength of 200 to 400 nanometers for a duration of up to about one-half second.

* * * * *